(12) United States Patent
Bhushan et al.

(10) Patent No.: US 11,102,782 B2
(45) Date of Patent: *Aug. 24, 2021

(54) TECHNIQUES FOR BEACON-ASSISTED MULTI-TIER SPECTRUM SHARING

(71) Applicant: QUALCOMM Incorporated, San Diego, CA (US)

(72) Inventors: Naga Bhushan, San Diego, CA (US); Michael Mingxi Fan, San Diego, CA (US); Peter Black, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,638

(22) Filed: Mar. 24, 2020

(65) Prior Publication Data
US 2020/0229191 A1    Jul. 16, 2020

Related U.S. Application Data

(63) Continuation of application No. 15/402,950, filed on Jan. 10, 2017, now Pat. No. 10,631,295.

(60) Provisional application No. 62/370,107, filed on Aug. 2, 2016.

(51) Int. Cl.
*H04W 72/04* (2009.01)
*H04W 16/14* (2009.01)
*H04W 56/00* (2009.01)
*H04W 72/10* (2009.01)

(52) U.S. Cl.
CPC ....... *H04W 72/0453* (2013.01); *H04W 16/14* (2013.01); *H04W 56/0015* (2013.01); *H04W 72/046* (2013.01); *H04W 72/10* (2013.01)

(58) Field of Classification Search
None
See application file for complete search history.

(56) References Cited

U.S. PATENT DOCUMENTS

| 6,405,048 | B1 | 6/2002 | Haartsen |
| 10,631,295 | B2 | 4/2020 | Bhushan et al. |
| 2006/0093026 | A1 | 5/2006 | Montojo et al. |
| 2007/0287469 | A1 | 12/2007 | Wijting et al. |
| 2009/0129326 | A1 | 5/2009 | Kim et al. |
| 2015/0264666 | A1 | 9/2015 | Yi et al. |
| 2016/0021664 | A1 | 1/2016 | Chou |

(Continued)

FOREIGN PATENT DOCUMENTS

WO    2015171759 A1    11/2015

OTHER PUBLICATIONS

International Search Report and Written Opinion—PCT/US2017/041841—ISA/EPO—dated Oct. 25, 2017.

*Primary Examiner* — Alex Skripnikov
(74) *Attorney, Agent, or Firm* — Shankar Krithivasan

(57) ABSTRACT

Various aspects described herein relate to techniques of spectrum sharing in beacon-assisted multi-tier wireless communications systems (e.g., 5G New Radio). A method of spectrum sharing in multi-tier wireless communications is provided that may include generating, at a first apparatus, a beacon signal including information of spectrum usage, wherein the information includes at least one or more of a pilot reference, resources allocation, one or more usage entities, or one or more sharing parameters, and sending the beacon signal to at least a second apparatus, wherein the first apparatus and the second apparatus are in a same tier or different tiers.

20 Claims, 6 Drawing Sheets

(56) References Cited

U.S. PATENT DOCUMENTS

2016/0173470 A1 6/2016 Chen et al.
2016/0278125 A1 9/2016 Liao et al.
2017/0339704 A1 11/2017 Matsumoto et al.

TECHNIQUES FOR BEACON-ASSISTED MULTI-TIER SPECTRUM SHARING

CROSS-REFERENCE TO RELATED APPLICATION

This application is a Continuation of U.S. patent application Ser. No. 15/402,950, entitled "TECHNIQUES FOR BEACON-ASSISTED MULTI-TIER SPECTRUM SHARING" filed Jan. 10, 2017 which claims priority to U.S. Provisional Application Ser. No. 62/370,107, entitled "BEACON-ASSISTED MULTI-TIER SPECTRUM SHARING" and filed on Aug. 2, 2016, each of which is assigned to the assignee hereof and are hereby expressly incorporated by reference herein in their entireties.

BACKGROUND

Aspects of the present disclosure relate generally to wireless communications systems, and more particularly, to techniques of spectrum sharing in beacon-assisted multi-tier wireless communications systems (e.g., the 5th Generation (5G) New Radio (NR)).

Wireless communications networks are widely deployed to provide various communication services such as telephony, video, data, messaging, broadcasts, and so on. Such networks, which are usually multiple access networks, support communications for multiple users by sharing the available network resources (e.g., time, frequency, power, and/or spectrum). Examples of such multiple access networks may support various air interface standards, and multiple-access technologies such as code division multiple access (CDMA), time division multiple access (TDMA), frequency division multiple access (FDMA), orthogonal frequency division multiple access (OFDMA), single-carrier frequency division multiple access (SC-FDMA), and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or an LTE-A system, deliver faster data throughput than older technologies, such increased downlink rates have triggered a greater demand for higher-bandwidth content, such as high-resolution graphics and video, for use on or with mobile devices. As such, demand for bandwidth on wireless communications systems continues to increase, however, wireless spectrum is a limited and regulated resource, especially when wireless communications systems include multiple tiers that may need to share the limited spectrum.

The 5G NR communications technology, used in a wide range of spectrum, is envisaged to expand and support diverse usage scenarios and applications with respect to current mobile network generations. In an aspect, 5G NR communications technology may include, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC), which can allow a very large number of connected devices and transmission of a relatively low volume of non-delay-sensitive information. In addition, as the demand for mobile broadband access continues to increase, there exists a need for further improvements in 5G communications technology and beyond. Preferably, these improvements may be applicable to other multi-access technologies and the telecommunication standards that employ these technologies.

Accordingly, due to the requirements for higher capacity and better resource utilization, new approaches are needed to efficiently share spectrum, to more fully utilize the limited frequency resource, and to help with further incentive for industry participation, in order to satisfy ever-increasing consumer demand and user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, a method of spectrum sharing in multi-tier wireless communications is provided. In an aspect, the method may include generating, at a first apparatus, a beacon signal including information of spectrum usage, wherein the information includes at least one or more of a pilot reference, resources allocation (e.g., present resources allocation), one or more usage entities, or one or more sharing parameters. In addition, the method may include sending or transmitting, by the first apparatus, the beacon signal to at least a second apparatus, wherein the first apparatus and the second apparatus are in a same tier or different tiers.

In another aspect of the disclosure, an apparatus for spectrum sharing in multi-tier wireless communications is provided. The apparatus may include a memory configured to store instructions, at least one processor coupled to the memory, wherein the at least one processor is configured to execute the instructions to generate a beacon signal including information of spectrum usage, wherein the information includes at least one or more of a pilot reference, resources allocation, one or more usage entities, or one or more sharing parameters, and a transceiver configured to transmit the beacon signal to at least another apparatus, wherein the two apparatuses are in a same tier or different tiers.

In an aspect of the disclosure, a computer-readable medium (e.g., a non-transitory computer-readable medium) storing computer code executable by a processor for spectrum sharing in multi-tier wireless communications is provided. The computer-readable medium may include code for generating, at a first apparatus, a beacon signal including information of spectrum usage, wherein the information includes at least one or more of a pilot reference, resources allocation, one or more usage entities, or one or more sharing parameters, and code for sending, by the first apparatus, the beacon signal to at least a second apparatus, wherein the first apparatus and the second apparatus are in a same tier or different tiers.

In another aspect of the disclosure, another method of spectrum sharing in multi-tier wireless communications is provided. The method may include determining, at a first apparatus, whether a beacon signal including information of spectrum usage is received from a second apparatus, wherein the information includes at least one or more of a pilot reference, resources allocation, one or more usage entities, or one or more sharing parameters, and utilizing, at the first apparatus and in response to the beacon signal being received from the second apparatus, spectrum based on the information received in the beacon signal.

To the accomplishment of the foregoing and related ends, the one or more aspects comprise the features hereinafter fully described. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1A:
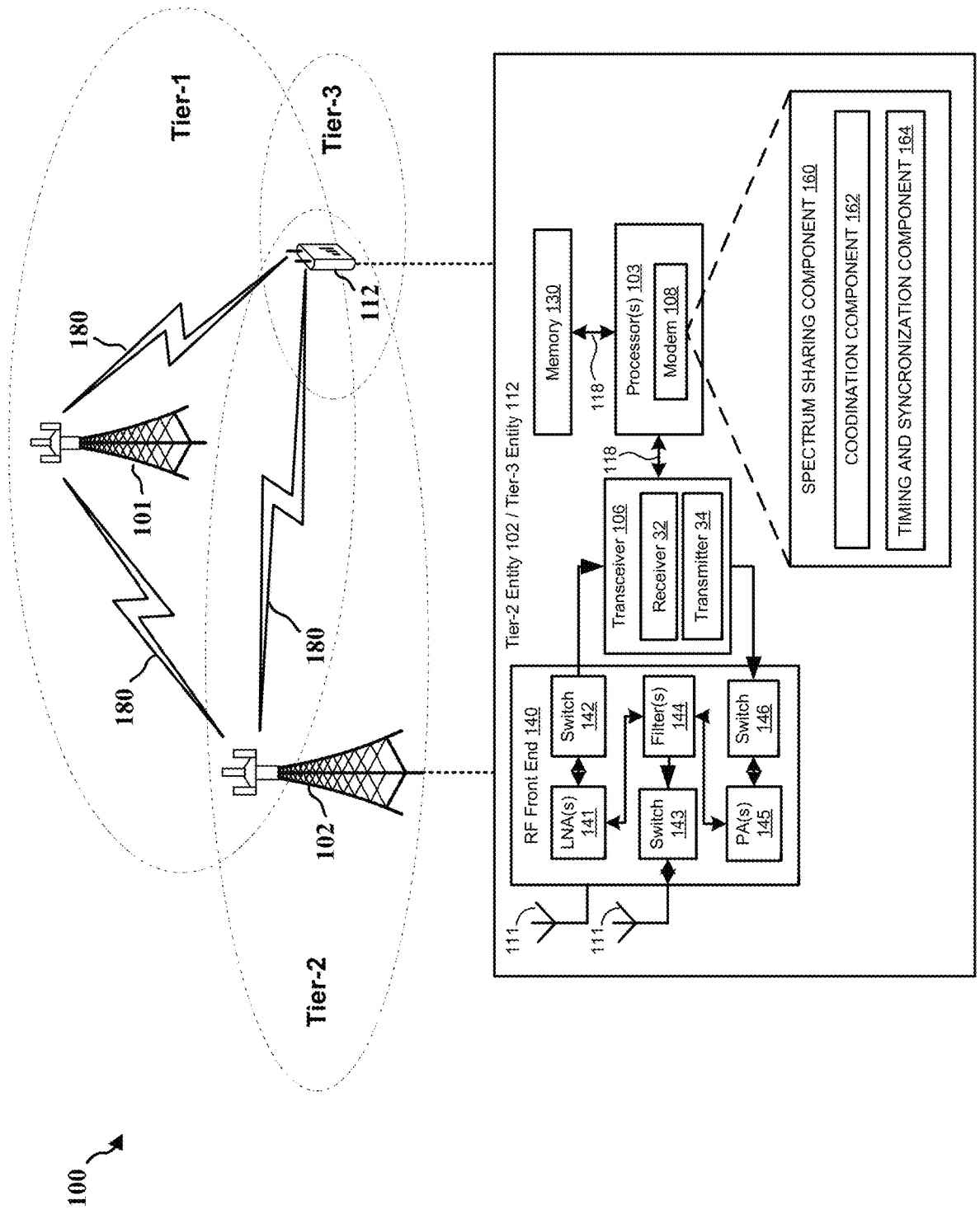
FIG. 1A is a block diagram of an example of a communications network including multi-tier entities configured to perform spectrum sharing, according to one or more of the presently described aspects.

In some current implementations, a multi-tier wireless communications system may require a centralized database to assign spectrum to operators or operating entities in different tiers. For example, a tier-1 operator may take absolute priority and have guaranteed resources via network (NW) allocation, while a tier-2 operator may take licensed-based allocation, typically with information embedded in a centralized database. Some tier-3 operating entities may share remaining resources using listen-before-talk (LBT) or frequency partition from the centralized database. However, using a centralized database for resources allocation may lead to low network efficiency. In addition, in some examples, the multi-tier wireless communications system may not provide an incentive for a tier-2 entity to participate, and may not allow the unused spectrum to be shared by tier-3 entities.

In some aspects, the present disclosure relates to efficient spectrum sharing in multi-tier wireless communications systems (e.g., 5G NR) with assistance from one or more beacon signals. In an aspect, the spectrum sharing may be autonomous because a centralized database for resources allocation may not be involved. In an example, to achieve higher capacity and better resource utilization, a multi-tier wireless communications system may have a beacon signal or a message broadcast (e.g., autonomously transmitted) by an incumbent or a network entity to indicate resource usage to facilitate decentralized spectrum sharing across different tiers. In some examples, the beacon may be used to advertise a priority (e.g., for resources allocation), to enable autonomous inter-tier or intra-tier coordination among operating entities, and/or to provide timing reference for synchronization among operating entities, for the purpose of spectrum sharing.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Techniques described herein may be used for various wireless communications systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communications systems). In addition, as those skilled in the art will readily appreciate, various aspects described throughout this disclosure may be extended to other telecommunications systems, network architectures and communication standards.

In wireless communications systems, a multi-tier network may include multiple spectrum sharing entities. These spectrum sharing entities may have, but not limited to, the following one or more tiers. In some implementations, networks may be classified by tiers based on the nature of their connection to other networks. There may be three tiers range from the largest (e.g., tier-1 entities with the highest priority) to the smallest (e.g., tier-3 entities with the lowest priority). For example, tier-1 network may include a legacy system (e.g., radar, fixed satellite service (FSS), etc.). Tier-2 network may include licensed entities with purchased coverage and allocation, for example, from tier-1 networks or government. Tier-3 entities may include unlicensed entities allowed to share resources not used by tier-1 and/or tier-2 entities. In an aspect, each tier may have its own priority, for example, a tier-1 entity has the highest priority, a tier-2 entity has a medium priority, and/or a tier-3 entity has the lowest priority among the three-tier system. In some aspects, the priority may be different for each tier, and the priority may be associated with or used for resources allocation or spectrum utilization.

In an aspect, one or more wireless communications systems may have entities in multiple tiers, for example, at least tier-1, tier-2, or tier-3. For example, a multi-tier communications system may include a tier-1 user operation which takes absolute priority and is guaranteed via network (NW) server allocation, while a tier-2 operator may take licensed-allocation, typically with information embedded in a centralized database. In the same communications systems, one or more tier-3 operating entities, for example, one or more unlicensed entities, may share remaining resource using listen-before-talk (LBT) or frequency partition from the centralized database, and multiple nodes of a same entity may cooperate accordingly. However, this multi-tier communications systems may require a centralized database to assign spectrum, leading to low efficiency. Moreover, this multi-tier communications system may provide no incentive for one or more tier-2 entities to participate, and may not allow the unused spectrum to be shared by one or more tier-3 entities.

This disclosure, in an aspect, relates to incentive for industry participation of spectrum sharing. For example, the regulator may enable early 5th Generation (5G) networks launch with large bandwidth (BW) of shared spectrum, however, existing spectrum may not be able to fullfil the large BW (e.g., around or above 100 MHz) requirement for 5G networks due to spectrum shortage. 5G networks (e.g., 5G NR) may support communications technology that is envisaged to expand and support diverse usage scenarios and applications with respect to current mobile network generations. In an aspect, the tier-2 operator(s) may be incentivized to go with indoor small-cell deployment with or without the need for synchronization and coordination with the tier-3 operator(s). For consumer, it may bring better service quality through more competitions. For new entrants, it may bring more opportunities for new service and revenue. As such, methods and apparatus for spectrum sharing where multiple entities may share in time without a centralized database for resources allocation are proposed and may be extendable to frequency sharing.

In an aspect, a periodic beacon transmission (e.g., narrowband or wideband) is sent from a higher tier entity (e.g., a tier-1 or a tier-2 licensed entity) or incumbent as indication of present spectrum usage and/or identification (e.g., transmitter identification, or identification of the transmitting entity), to lower tier entities (e.g., tier-3 entities). The beacon transmission may include information of pilot reference, resources allocation (e.g., present resources allocation), usage entities, and/or sharing parameters.

In an aspect, the beacon transmission with controlled power (e.g., full power allowed in the given band) concentrated narrowly in time, in frequency or in time-frequency, for example, in a single or a few Resource Blocks (RBs) within at least one orthogonal frequency division multiplexing (OFDM) symbol (e.g., one or two OFDM symbols), may create a "Flash OFDM"-like signal with penetration much deeper (e.g., 20 dB or more) than wideband transmission. In an implementation, the beacon signals/transmission may be transmitted using transmitter-controlled power including full power operation. In another aspect, the beacon (e.g., a beacon signal) may be transmitted in every N (e.g., from a hundred to a couple of thousand) radio frames which, for example, may be in low duty cycle and/or with minimal overhead. In an aspect, the beacon is sent for the purpose of resource reservation as well as a reference for inter-tier or intra-tier spectrum sharing.

In an aspect, the beacon signal may be transmitted between same tier entities, for example, from a tier-2 entity to one or more tier-2 entities, or from a tier-3 entity to one or more tier-3 entities. In an aspect, the beacon transmissions and/or receptions are based on a priority associated with each entity. For example, a tier-2 entity may have higher priority than a tier-3 entity, and the entities in the same tier may have same priority.

In an aspect, when a higher tier operator (e.g., a tier-2 entity) is transmitting a beacon signal, there are no other signals or data transmissions exist to potentially interference the beacon signal.

In another aspect, when a higher tier entity (e.g., a tier-2 entity) is transmitting a beacon signal, another entity in the same tier (e.g., another tier-2 entity) may join other entities (e.g., tier-2 base stations or tier-3 small cell boxes) and/or only listen (e.g., enter LBT mode) without sending any signals, and may wait until next time to transmit signals (e.g., beacon signals or data signals). In an aspect, the lower-tier entities (e.g., tier-3 entities) may only listen to the higher-tier (e.g., tier-2) entity during at least the beacon transmission period.

In an aspect, at least one lower-tier entity (e.g., a tier-3 entity) may use the information in the beacon signal transmitted from at least a higher-tier entity (e.g., a tier-2 entity), to synchronize the timing with the higher-tier entity. In another aspect, at least one higher-tier entity (e.g., a tier-2 entity) may use the information in the beacon signal transmitted to synchronize the timing with at least one lower-tier entity (e.g., a tier-3 entity).

In an aspect, the beacon signal may be sent from a UE to at least another UE (e.g., a peer-to-peer (P2P) transmission, or in an ad-hoc network) to share spectrum and/or synchronize the timing between the at least two UEs. In an example, the spectrum sharing between the at least two UEs may be in a multi-tier wireless communications system (e.g., the multi-tier wireless communications system 100 in FIG. 1A).

In an aspect, the beacon signal may be sent from a base station (e.g., a tier-1 or a tier-2 base station) to at least a UE (e.g., a tier-3 UE) to share spectrum and/or synchronize the timing. In an example, the spectrum sharing among the base station and UEs may be in a multi-tier wireless communications system (e.g., the multi-tier wireless communications system 100 in FIG. 1A).

In another aspect, the beacon signal may be used for location estimation in a multi-tier wireless communications system (e.g., the multi-tier wireless communications system 100 in FIG. 1A).

In an aspect, lower tier entities (e.g., tier-3 entities) may follow sharing rules per information received in the beacon signal transmitted from a higher tier entities (e.g., a tier-2 entity). In an aspect, the lower tier entities (e.g., tier-3 entities) may obtain sharing parameters (e.g., spectrum sharing parameters) and/or timing reference from monitoring and reading the received beacon signal. In an aspect, the beacon signal may also provide a natural timing reference to tier-3 entities, potentially enabling, for example, low cost small cell boxes, and may encourage a tier-2 or licensed entity to position indoor deployment as tier-3. In an aspect, if tier-3 entities do not hear any beacon signal, the tier-3 entities may operate with listen-before-talk (LBT) in entire frequency band or entire time.

Referring to FIG. 1A, in an aspect, a multi-tier wireless communications system 100 may include at least one network entity 101 (e.g., a base station). In an aspect, the network entity 101 is a tier-1 network entity in a legacy system (e.g., radar, FSS). In another aspect, the multi-tier wireless communications system 100 includes at least one tier-2 network entity 102 (e.g., a licensed entity with purchased coverage and allocation). In some aspects, multiple network entities including one or more tier-1 network entities 101 in communication with one or more tier-2 network entities 102, and may be in communication coverage with one or more other tier-1 or tier-2 network entities. In an aspect, the tier-1 network entity 101 or tier-2 network entity 102 may be a base station such an eNodeB or an eNB. Although various aspects are described in relation to a 5G NR network, similar principles may be applied in an LTE network, Evolution-Data Optimized (EV-DO) network, or other wireless wide area networks (WWAN). The wireless network may employ a scheme where multiple base stations may transmit on a channel. In an example, a tier-1 network entity 101 may transmit wireless communications (e.g., beacon signals) to other tier-1 network entities and/or the tier-2 network entity 102. In an aspect, a tier-2 network entity 102 may transmit wireless communications (e.g., beacon signals) to the tier-1 network entity 101, and/or other tier-2 network entities.

In another aspect, the multi-tier wireless communications system 100 may include at least one a tier-3 operating entity 112 (e.g., a small cell box). A tier-3 operating entity 112 may include unlicensed entities allowed to share resource not used by tier-1 (e.g., the tier-1 network entity 101) and tier-2 entities (e.g., the tier-2 network entity 102). The tier-3 operating entity 112 (e.g., a small cell box) may operate in a licensed and/or an unlicensed frequency spectrum. When operating in an unlicensed frequency spectrum, the tier-3 operating entity 112, in an aspect, may employ LTE and use the same or close to 5 GHz unlicensed frequency spectrum as used by the Wi-Fi AP 150. The tier-3 operating entity 112, employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire. The tier-3 operating entity 112 may in communication with one or more tier-1 network entity 101 and/or one or more tier-2 network entity 102 via communication links 180, which may include beacon signal transmissions and receptions.

In some aspects, the tier-1 network entity 101, the tier-2 network entity 102, and/or the tier-3 operating entity 112 may enable autonomous inter-tier or intra-tier coordination and/or time references/synchronizations, and may communicate the timing and other spectrum sharing information, for example, via the communication links 180 for spectrum sharing. In an aspect, these communication links may include one or more beacon signals. In some other aspects, the tier-1 network entity 101 and the tier-2 network entity 102 may negotiate a timing agreeable to both. In some other aspects, the tier-2 network entity 102 and the tier-3 operating entity 112 may autonomously coordinate and may negotiate a timing agreeable to both. For example, the tier-2 network entity 102 may transmit a beacon signal to enable autonomous inter-tier or intra-tier coordination and/or timing reference/synchronization. In another example, the tier-3 operating entity 112 may receive a beacon signal with spectrum sharing parameters and timing references.

Additionally, the tier-1 network entity 101, the tier-2 network entity 102, and/or the tier-3 operating entity 112 may be a macrocell, picocell, femtocell, relay, Node B, mobile Node B, user equipment (UE) (e.g., communicating in peer-to-peer or ad-hoc mode with UE 12), or substantially any type of component that can communicate with a UE to provide wireless network access at the UE.

According to the present aspects, the tier-2 network entity 102, and/or the tier-3 operating entity 112 may include one or more processors 103 and a memory 130 that may operate in combination with a spectrum sharing component 160 to control an IC component for performing IC on transmitted and/or received signals. For example, the spectrum sharing component 160 may perform autonomous multi-tier spectrum sharing. In an aspect, the term "component" as used herein may be one of the parts that make up a system, may be hardware, firmware, and/or software, and may be divided into other components. The spectrum sharing component 160 may be communicatively coupled to a transceiver 106, which may include a receiver 32 for receiving and processing RF signals and a transmitter 34 for processing and transmitting RF signals. The spectrum sharing component 160 may include a coordination component 162 to coordinate the communications and/or spectrum sharing, inter-tier or intra-tier, in the multi-tier wireless communications system 100, and a timing and synchronization component 164. The processor 103 may be coupled to the transceiver 106 and memory 130 via at least one bus 118.

In an aspect, tier-1 network entity 101 may include one or more components discussed herein (e.g., transceiver 106, one or more processors 103, memory 130, spectrum sharing component 160, and/or any components in FIG. 1A) which may enable tier-1 network entity 101 to perform spectrum sharing according to one or more of the described aspects.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver may receive signals (e.g., beacon signals) transmitted by a tier-1 network entity 101, a tier-2 network entity 102, and/or a tier-3 operating entity 112. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter. In an aspect, the transmitter 34 may transmit signals (e.g., beacon signals) to one or more tier-1 network entity 101, one or more tier-2 network entity 102, and/or one or more tier-3 operating entity 112.

In an aspect, the one or more processors 103 can include a modem 108 that uses one or more modem processors. The various functions related to the spectrum sharing component 160 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in spectrum sharing component 160, including the coordination component 162 and/or the timing and synchronization component 164.

The spectrum sharing component 160 may include hardware, firmware, and/or software code executable by a processor for autonomous spectrum sharing. For example, the hardware may include, for example, a hardware accelerator, or specialized processor.

The coordination component 162 may include hardware, firmware, and/or software code executable by a processor for coordinating the communications and/or spectrum sharing, inter-tier or intra-tier, in multi-tier wireless communications. For example, the hardware may include, for example, a hardware accelerator, or specialized processor.

The timing and synchronization component 164 may include hardware, firmware, and/or software code executable by a processor for time synchronization with one or more network entities or UEs. For example, the hardware may include, for example, a hardware accelerator, or specialized processor.

Moreover, in an aspect, the tier-2 network entity 102, and/or the tier-3 operating entity 112 may include RF front end 140 and transceiver 106 for receiving and transmitting radio transmissions, for example, wireless communications 26 transmitted by a tier-1 network entity, a tier-2 network entity, and/or a tier-3 operating entity. For example, transceiver 106 may receive a signal that includes a pilot signal (e.g., common pilot channel (CPICH)) from each network entity, which in this example combine to form a received signal. The transceiver 106 may measure the received pilot signal in order to determine signal quality and for providing feedback to a network entity. For example, transceiver 106 may communicate with modem 108 to transmit messages (e.g., messages in a beacon signal) generated by the spectrum sharing component 160 and to receive messages and forward them to the spectrum sharing component 160.

RF front end 140 may be connected to one or more antennas 111 and can include one or more low-noise amplifiers (LNAs) 141, one or more switches 142, 143, one or more power amplifiers (PAs) 145, and one or more filters 144 for transmitting and receiving RF signals. In an aspect, components of RF front end 140 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 140 may use one or more switches 142, 143 to select a particular LNA 141 and its specified gain value based on a desired gain value for a particular application. In an aspect, the RF front end 140 may provide measurements (e.g., Ec/Io) and/or applied gain values to the spectrum sharing component 160.

Further, for example, one or more PA(s) 145 may be used by RF front end 140 to amplify a signal for an RF output at a desired output power level. In an aspect, each PA 145 may have a specified minimum and maximum gain values. In an aspect, RF front end 140 may use one or more switches 143, 146 to select a particular PA 145 and its specified gain value based on a desired gain value for a particular application.

Also, for example, one or more filters 144 can be used by RF front end 140 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 140 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 111 via RF front end 140. In an aspect, transceiver may be tuned to operate at specified frequencies such that the tier-2 network entity 102, and/or the tier-3 operating entity 112 can communicate with, for example, a UE (e.g., UE 104 in FIG. 1B). In an aspect, for example, modem 108 can configure transceiver 106 to operate at a specified frequency and power level based on the network entity or the UE configuration and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of the network entity or UE (e.g., RF front end 140, transceiver 106) to enable transmission and/or reception of signals from/to the network or another network based on a specified modem configuration. In an aspect, the modem configuration can be based on the mode of the modem and the frequency band in use. In another aspect, the modem configuration can be based on network or UE configuration information associated with the network or UE as provided by the network during cell selection and/or cell reselection.

The tier-2 network entity 102, and/or the tier-3 operating entity 112 may further include memory 130, such as for storing data used herein and/or local versions of applications or spectrum sharing component 160 and/or one or more of its subcomponents being executed by processor 103. Memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining spectrum sharing component 160 and/or one or more of its subcomponents, and/or data associated therewith, when UE 12 is operating processor 103 to execute spectrum sharing component 160 and/or one or more of its subcomponents. In another aspect, for example, memory 130 may be a non-transitory computer-readable storage medium.

Figure 1B:
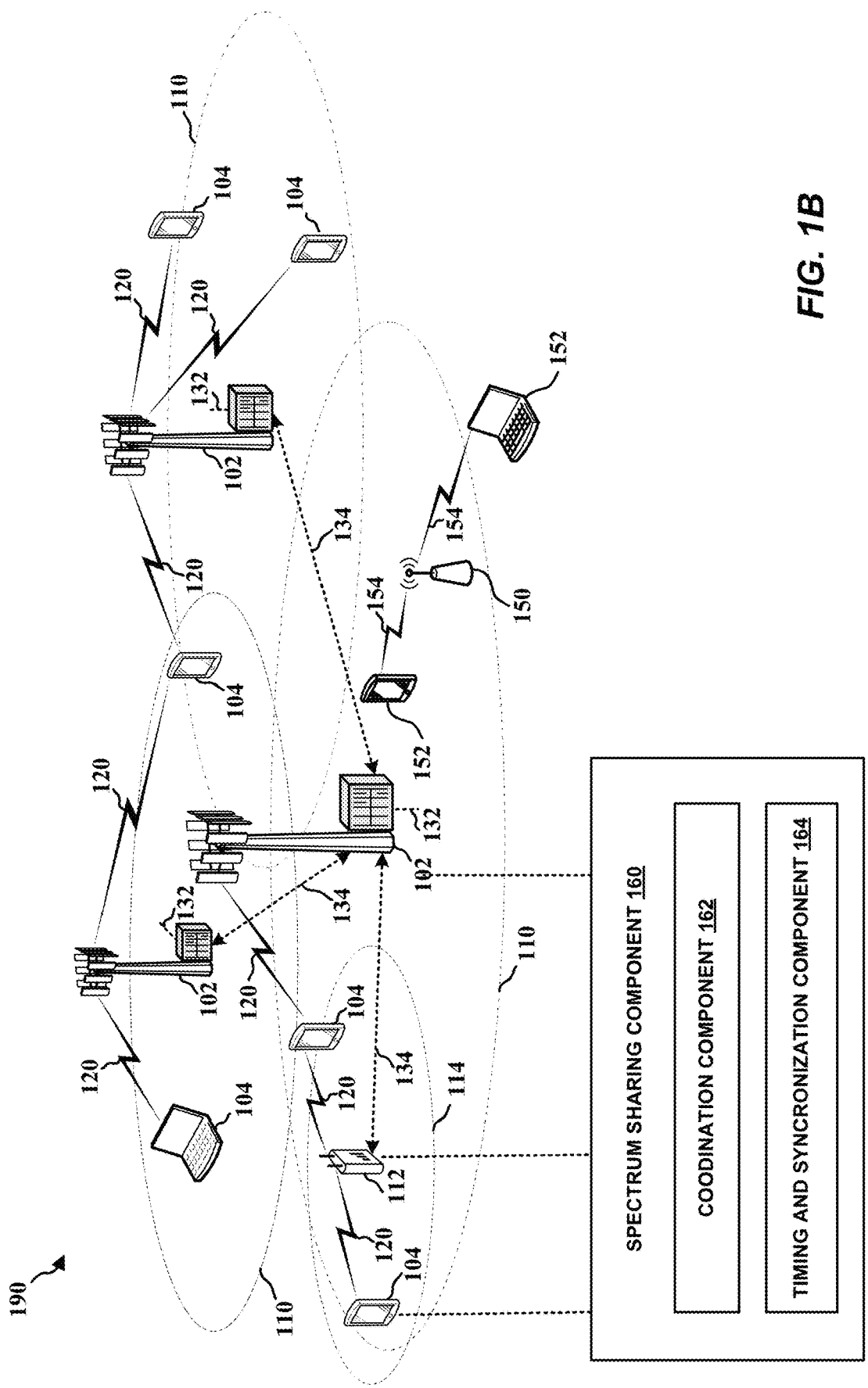
FIG. 1B is a block diagram of another example of a communications network including base stations and user equipment configured to perform multi-tier spectrum sharing, according to one or more of the presently described aspects.

FIG. 1B shows an example of a wireless communications system 190, including one or more access networks 110, or one or more multi-tier wireless communications system 100 in FIG. 1A, having a spectrum sharing component 160 configured to make inter-tier or intra-tier coordination and/or time synchronization for multiple operators in a shared spectrum. In an aspect, the multiple operators may include multiple entities to share the spectrum in time autonomously. In another aspect, the multiple operators may include multiple entities to share the spectrum in frequency autonomously. In an aspect, the inter-tier or intra-tier coordination and/or time synchronization among network entities or devices may be enabled by transmitting and/or receiving at least a beacon signal (e.g., a deep penetrating beacon signal). In an aspect, the spectrum sharing component 160 may include a coordination component 162 (e.g., for inter-tier or intra-tier coordination) to coordinate the communications and/or spectrum sharing in the multi-tier wireless communications system 190, and a timing and synchronization component 164 configured to work with other components, to generate, transmit and receive timing reference (e.g., in a beacon signal) for synchronization between two entities or among multiple operators for spectrum sharing.

The details of the operation and architecture associated with spectrum sharing component 160 are discussed in more detail below with respect to FIGS. 3 and 4. The wireless communications system 190 (also referred to as a wireless wide area network (WWAN)) includes base stations 102, UEs 104, and/or an Evolved Packet Core (EPC) (not shown). The base stations 102 may include macro cells (high power cellular base station) and/or small cells (low power cellular base station). The macro cells include eNBs. The small cells include femtocells, picocells, and microcells.

In some examples, the wireless communications system 190 (or the multi-tier wireless communications system 100 in FIG. 1A) may be or include a Long Term Evolution (LTE) or LTE-Advanced (LTE-A) network. The wireless communications system 100 or 190 may also be a next generation network, such as a 5G wireless communications network or a 5G NR. In LTE/LTE-A networks, the term evolved node B (eNB) may be generally used to describe the base stations 102, while the term UE may be generally used to describe the UEs 104. The wireless communications system 100 may be a heterogeneous LTE/LTE-A network in which different types of eNBs provide coverage for various geographical regions. For example, each eNB or base station 102 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macrocell may cover a relatively large geographic area (e.g., several kilometers in radius) and may allow unrestricted access by UEs 104 with service subscriptions with the network provider.

A smallcell may include a lower-powered base station, as compared with a macro cell, that may operate in the same or different (e.g., licensed, unlicensed, etc.) frequency bands as macrocells. Small cells may include picocells, femtocells, and microcells according to various examples. A picocell, for example, may cover a small geographic area and may allow unrestricted access by UEs 104 with service subscriptions with the network provider.

A femtocell may also cover a small geographic area (e.g., a home) and may provide restricted access by UEs 104 having an association with the femtocell (e.g., UEs 104 in a closed subscriber group (CSG), UEs 104 for users in the home, and the like).

An eNB for a macrocell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

In some aspect, the base stations 102 (collectively referred to as Evolved Universal Mobile Telecommunications System (UMTS) Terrestrial Radio Access Network (E-UTRAN)) interface with the EPC through backhaul links 132 (e.g., S1 interface). In an aspect, the base stations 102 may be a tier-1 network entity in a legacy system (e.g., radar, FSS). In another aspect, the base stations 102 may be a tier-2 network entity (e.g., a licensed entity with purchased coverage and allocation). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC) with each other over backhaul links 134 (e.g., X2 interface). The backhaul links 134 may be wired or wireless.

In some aspects, the base stations 102 may wirelessly communicate with the UEs 104. Each of the base stations 102 may provide communication coverage for a respective geographic coverage area 110. There may be overlapping geographic coverage areas 110. For example, a tier-3 operating entity 112 (e.g., a small cell) may have a coverage area 114 that overlaps the coverage area 110 of one or more macro base stations 102. A network that includes both small cell and macro cells may be known as a heterogeneous network. A heterogeneous network may also include Home Evolved NodeBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The communication links may include one or more beacon signals. The base stations 102/UEs 104 may use spectrum up to Y MHz (e.g., where Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 190 may further include a Wi-Fi access point (AP) 150 in communication with Wi-Fi stations (STAs) 152 via communication links 154 in an unlicensed frequency spectrum (e.g., 5 GHz). When communicating in an unlicensed frequency spectrum, the STAs 152/AP 150 may perform a clear channel assessment (CCA) or listen-before-talk (LBT) functionality prior to communicating in order to determine whether the channel is available (e.g., generally, to avoid transmitting on a channel where another transmission is occurring, which would cause interference).

Additionally, one or more of base stations 102 and/or UEs 104 may operate according to a 5G NR technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 102 and/or UEs 104 operating according to the mmW technology may utilize beamforming in their transmissions to compensate for the extremely high path loss and short range.

The tier-3 operating entity 102 or 112 (e.g., a small cell) may operate in a licensed and/or an unlicensed frequency spectrum. When operating in an unlicensed frequency spectrum, the tier-3 operating entity 102 or 112, in an aspect, may employ LTE and use the same or close to an unlicensed frequency spectrum (e.g., 5 GHz) as used by the Wi-Fi AP 150. The tier-3 operating entity 102 or 112, employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

Tier-1 an/or tier-2 base stations 102, tier-3 operating entity 102 or 112, UEs 104, APs 150, and STAs 152 may also operate in one or more shared frequency bands, such as according to General Authorized Access (GAA) in the 3.5 GHz band.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some aspects, the tier-1 network entity (e.g., a base station 102), the tier-2 network entity (e.g., another base station 102), and/or tier-3 operating entity (e.g., small cell box 112) may enable autonomous inter-tier or intra-tier coordination and/or timing references/synchronizations, and may communicate the timing and other spectrum sharing information, for example, via the communication links 120, 154, and/or a communication link between two base stations 102, and/or a communication link between base station 102 and tier-3 operating entity 112, for spectrum sharing. In an aspect, these communication links may include one or more beacon signals. In some other aspects, the tier-1 network entity and the tier-2 network entity may negotiate a timing agreeable to both. In some other aspects, the tier-2 network entity and the tier-3 operating entity may autonomously coordinate and may negotiate a timing agreeable to both. For example, the tier-2 network entity may transmit a beacon signal to enable autonomous inter-tier or intra-tier coordination and/or timing reference/synchronization. In another example, the tier-3 operating entity 112 may receive a beacon signal with spectrum sharing parameters and timing references.

Figure 2A:
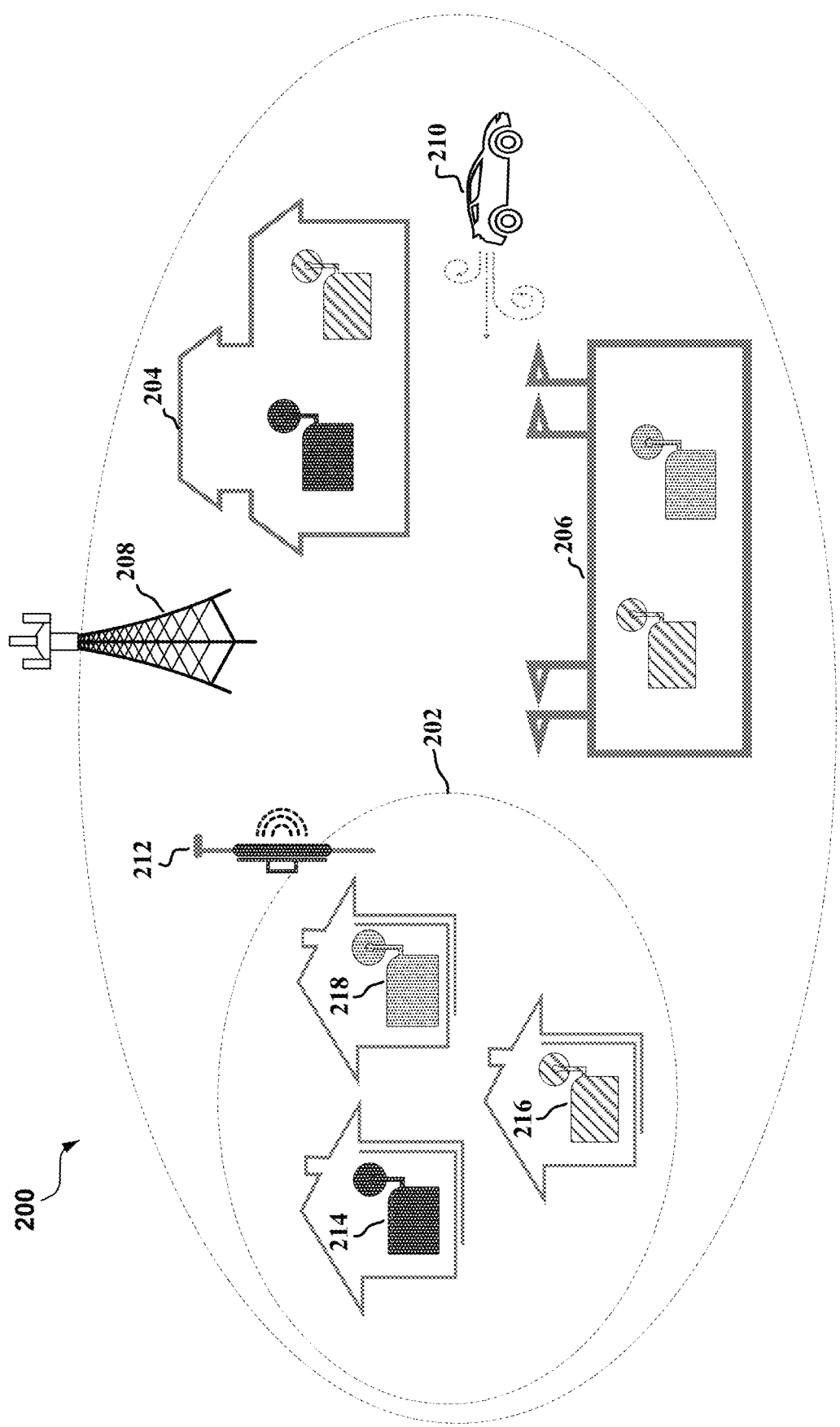
FIG. 2A is an autonomous spectrum sharing paradigm in a multi-tier co-existence network.

Referring to FIG. 2A, a spectrum sharing paradigm in a multi-tier co-existence network 200 is illustrated. In some examples, the multi-tier co-existence network 200 may be an implementation of the multi-tier wireless communications system 100 in FIG. 1A or the wireless communications system 190 in FIG. 1B. In an aspect, the multi-tier co-existence network 200 may be a mobile network operator (MNO) macro network (e.g., macrocells), and may include a network 202 for residential/neighborhood area, a network 204 for enterprise buildings, and/or a network 206 for venue environments. Additionally, in an implementation, the multi-tier co-existence network 200 may include one or more network entities 208 in a licensed tier (e.g., base station 102 in FIGS. 1A and 1B), one or more network entities 212 in an unlicensed tier (e.g., tier-3 operating entity 112), and/or one or more vehicles 210.

In an aspect, the network entity 208 may be a primary access licensed (PAL) tier (e.g., tier-2) entity, and may transmit at least a beacon signal (e.g., a reservation beacon 222 in FIG. 2B) or data signals (e.g., PAL tier signal transmissions 224 and/or 228 in FIG. 2B) to the unlicensed tier (e.g., a tier-3 operating entity, or small cell box 112 in FIGS. 1A and 1B) entity 212, one or more vehicles 210, and/or one or more licensed or unlicensed tier entities in the network 202, the network 204, or the network 206. In an example, the network 202 may include a licensed (e.g., PAL) tier entity 216, and unlicensed tier (e.g., tier-3) entities 214 and 218. In some examples, a PAL tier entity may be a tier-2 entity in a three-tier network, e.g., with Citizens Broadband Radio Service (CBRS) for shared wireless broadband use of 3.5 GHz band. The PAL tier entity may have a lower priority for resources allocation or spectrum sharing than a tier-1 entity (e.g., an entity for incumbent (radar) signals communications), but may have a higher priority for resources allocation or spectrum sharing than a tier-3 entity (e.g., an unlicensed tier entity).

Figure 2B:
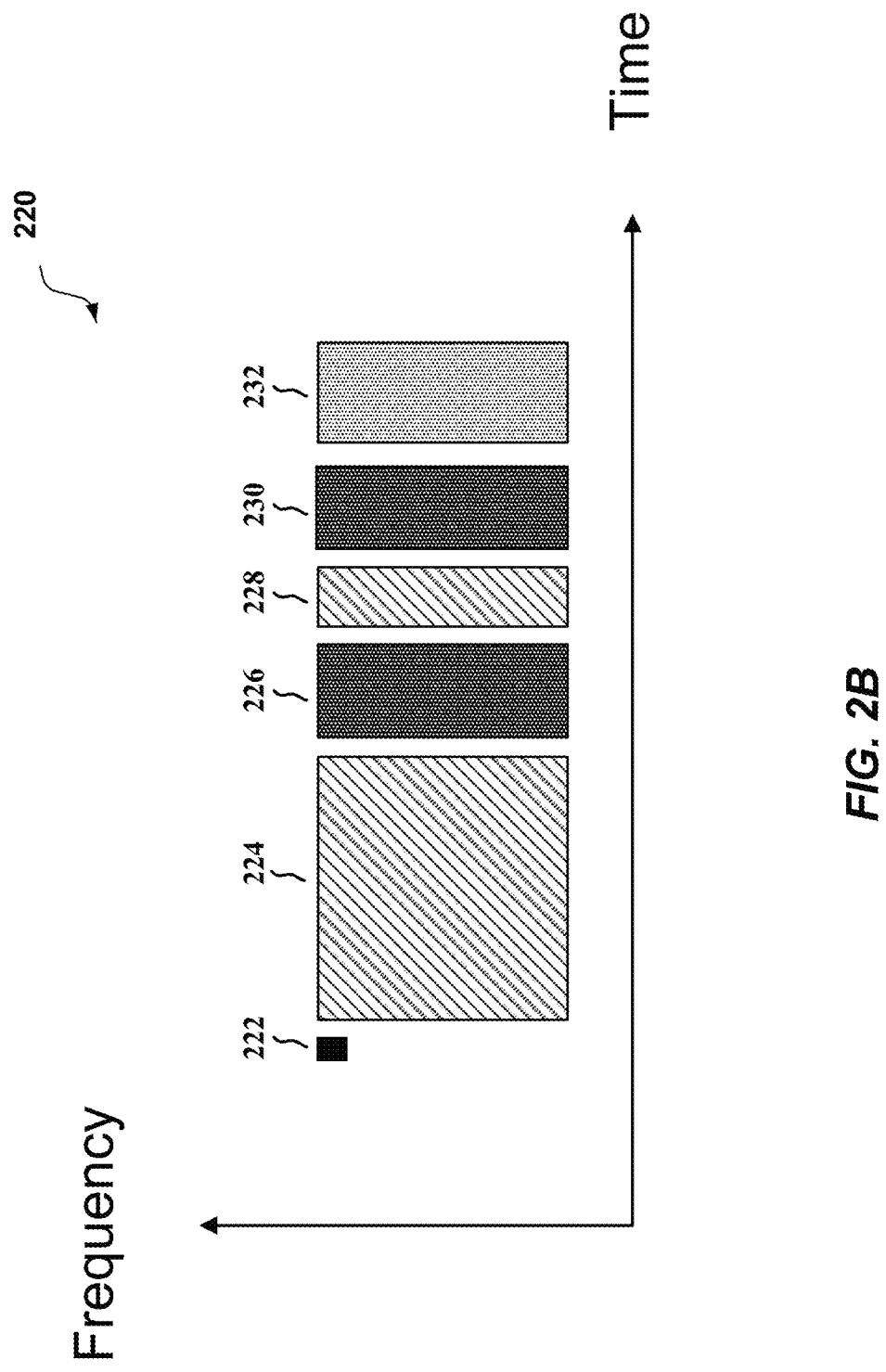
FIG. 2B is an example of signal transmissions across frequency over time in a multi-tier co-existence network according to the spectrum sharing paradigm in FIG. 2A.

Referring to FIG. 2B, in an aspect, the multi-tier co-existence network 200 in FIG. 2A may use a two-tier spectrum sharing scheme, and signal transmissions of the multi-tier co-existence network 200 using the two-tier spectrum sharing scheme may be shown in an example 220, which includes the time and frequency resources used by multiple entities in the multi-tier co-existence network 200. In an example, the multi-tier co-existence network 200 using the two-tier spectrum sharing scheme may include one or more entities in a PAL tier (e.g., tier-1 or tier-2) and one or more entities in an unlicensed (e.g. generalized authorized access) tier (e.g., tier-3). In an example, a PAL tier operator may indicate resource via at least a beacon signal (e.g., a reservation beacon 222). In an aspect, the PAL tier operator (e.g., via network entity 208) or an entity in the PAL tier may offload traffic or data communications to indoor communications which may include unlicensed tier (e.g., an ad-hoc network in tier-3) communications. For example, as shown in the example 220, PAL tier signal transmissions 224 and/or 228 may share the frequencies with unlicensed tier (e.g., tier-3) transmissions 226, 230, and/or 232 by using different time slots.

In another aspect, the PAL tier operator (e.g., via network entity 208) may share the spectrum in frequency. For example, PAL tier signal transmissions may be shared with unlicensed tier (e.g., tier-3) transmissions in a same time slot but with different frequencies. In an aspect, the PAL tier operator or one or more entities in the PAL tier may benefit from indoor communications offload to an unlicensed tier (e.g., tier-3) because the cost may be lower and reduced. In some implementations, at least one of the network 202, the network 204, or the network 206 in FIG. 2A may include both licensed and unlicensed tier entities that shares spectrum in frequency. For example, in the network 202, one or more unlicensed tier entities 214 and 218 may handle the offloaded data traffic from a licensed tier entity (e.g., the licensed tier entity 216) by using different frequencies in a same time slot to shared spectrum.

Figure 3:
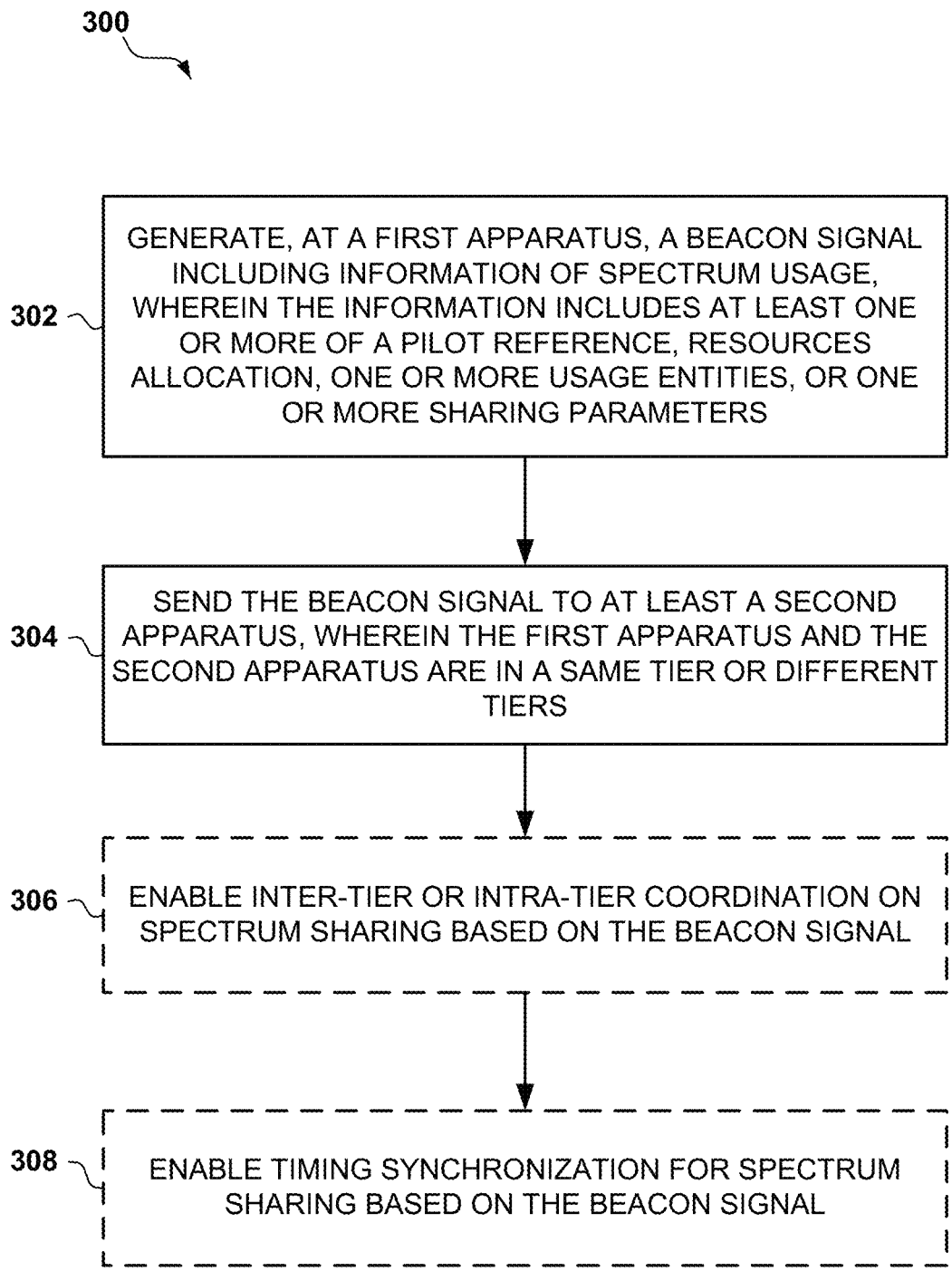
FIG. 3 is a flow diagram of an example of a method of beacon-assisted multi-tier spectrum sharing in wireless communications, according to one or more of the presently described aspects.

Referring to FIG. 3, in an operational aspect, a tier-2 network entity (e.g., base station 102 in FIG. 1) or a UE such as UE 104 (FIG. 1) may perform one aspect of a method 300 for spectrum sharing in a multi-tier network. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 302, the method 300 may include generating, at a first apparatus, a beacon signal including information of spectrum usage, wherein the information includes at least one or more of a pilot reference, resources allocation, one or more usage entities, or one or more sharing parameters. In an aspect, for example, the spectrum sharing component 160 and/or one or more of its subcomponents (e.g., the coordination component 162) may be configured to operate in combination with the one or more processors 103, the memory 130, and/or transceiver 106 to generate a beacon signal at a first apparatus (e.g., a tier-2 network entity, or base station 102 in FIG. 1). The beacon signal (e.g., the reservation beacon 222 in FIG. 2B) may include, for example, information of spectrum usage. In an aspect, the information may include at least a pilot reference, resources allocation (e.g., present resources allocation), usage entities, or sharing parameters.

In an aspect, at block 304, the method 300 may include sending, by the first apparatus, the beacon signal to at least a second apparatus, wherein the first apparatus and the second apparatus are in a same tier or different tiers. In an aspect, for example, the spectrum sharing component 160 and/or one or more of its subcomponents (e.g., the coordination component 162) may be configured to operate in combination with the one or more processors 103, the memory 130, and/or transceiver 106 to send or transmit the beacon signal (e.g., the reservation beacon 222 in FIG. 2B) to at least a second apparatus (e.g., a tier-2 entity or a tier-3 operating entity) in a same tier (e.g., both the first apparatus and the second apparatus are in tier-2), or in a tier (e.g., tier-3) different from the tier (e.g., tier-2) of the first apparatus.

In an aspect, at block 306, the method 300 may optionally include enabling inter-tier or intra-tier coordination for spectrum sharing based on the beacon signal. In an aspect, for example, the spectrum sharing component 160 and/or the coordination component 162 may be configured to operate in combination with the one or more processors 103, the memory 130, and/or transceiver 106 to enable autonomous inter-tier or intra-tier coordination for spectrum sharing based on the beacon signal.

In an aspect, at block 308, the method 300 may optionally include enabling timing synchronization for spectrum sharing based on the beacon signal. In an aspect, for example, the spectrum sharing component 160 and/or the timing and synchronization component 164 may be configured to operate in combination with the one or more processors 103, the memory 130, and/or transceiver 106 to enable autonomous timing synchronization for spectrum sharing based on the beacon signal.

In another aspect of the method 300, the beacon signal may include an identification of the first apparatus. In an aspect, for example, the beacon signal (e.g., the reservation beacon 222 in FIG. 2B) generated at block 302 may include, for example, an identification of the first apparatus.

In another aspect, the method 300 may include sending the beacon signal with controlled power in one or more resource blocks. In an aspect, for example, the spectrum sharing component 160 may be configured to operate in combination with the transceiver 106 to send or transmit the beacon signal with controlled power (e.g., full power) in one or a few resource blocks.

In an aspect, the method 300 may include sending the beacon signal periodically. In an aspect, for example, the spectrum sharing component 160 may be configured to operate in combination with the transceiver 106 to send or transmit the beacon signal periodically.

In another aspect of the method 300, the first apparatus may be in a tier (e.g., tier-2) having a higher priority for resources allocation than the tier (e.g., tier-3) of the second apparatus.

In an aspect of the method 300, the first apparatus (e.g., a tier-2 network entity, or base station 102 in FIG. 1) and the second apparatus (e.g., a tier-3 operating entity, or small cell box 112 in FIG. 1) may share spectrum in time or frequency.

Figure 4:
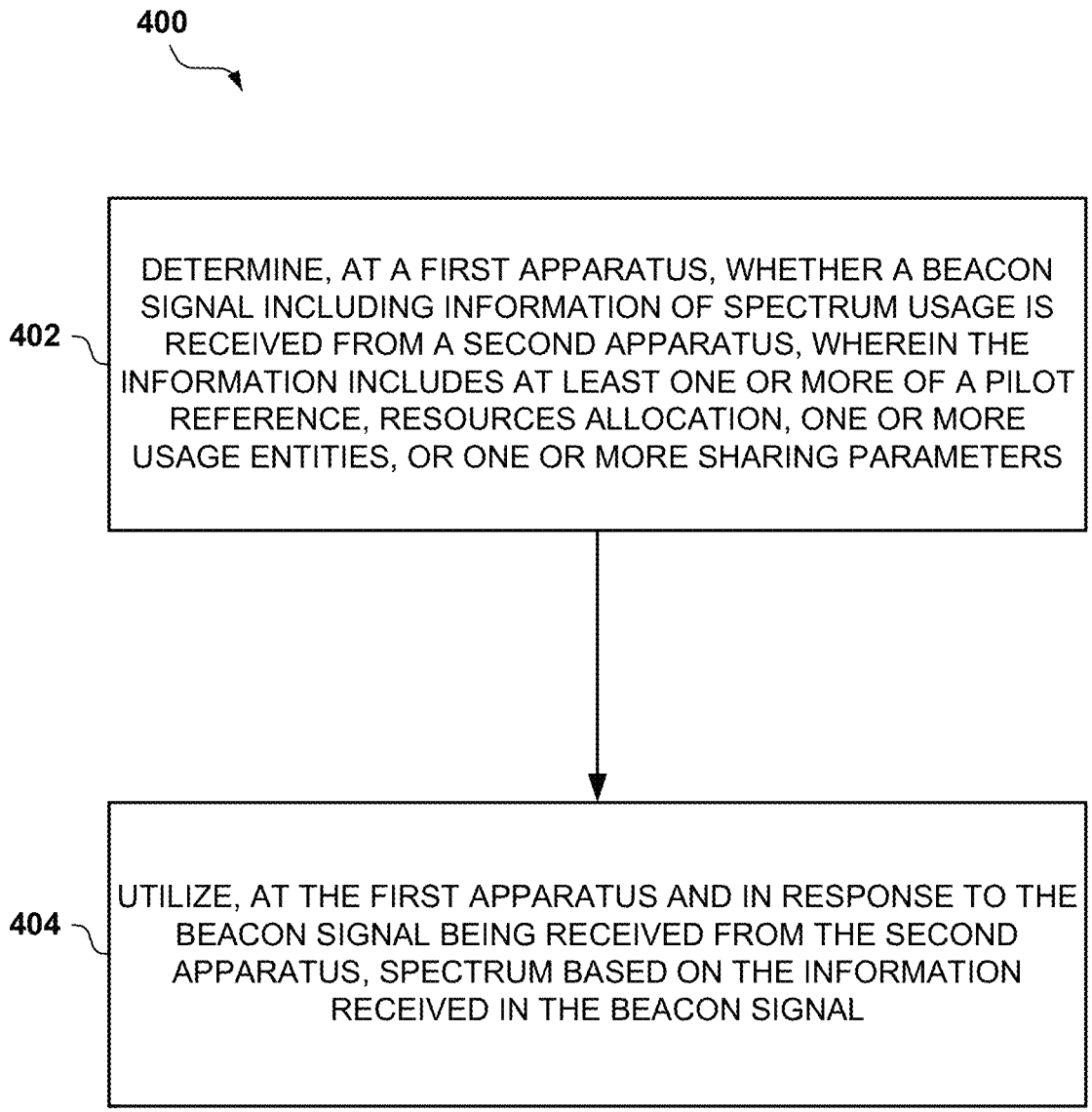
FIG. 4 is a flow diagram of another example of a method of beacon-assisted multi-tier spectrum sharing in wireless communications, according to one or more of the presently described aspects.

Referring to FIG. 4, in an operational aspect, a tier-3 operating entity 102 or 112 (e.g., a small cell 112 in FIG. 1) or a UE such as UE 104 (FIG. 1) may perform one aspect of a method 400 for spectrum sharing in a multi-tier network. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 402, the method 400 may determining, at a first apparatus, whether a beacon signal including information of spectrum usage is received from a second apparatus, wherein the information includes at least one or more of a pilot reference, resources allocation, one or more usage entities, or one or more sharing parameters. In an aspect, the beacon signal may include information of timing reference. In an aspect, for example, the spectrum sharing component 160 and/or one or more of its subcomponents may be configured to operate in combination with the one or more processors 103, the memory 130, and/or transceiver 106 to determine whether a beacon signal including information of spectrum usage is received, for example, at a tier-2 or a tier-3 network entity form another tier-2 or tier-3 network entity.

In an aspect, at block 404, the method 400 may include utilizing, at the first apparatus and in response to the beacon signal being received from the second apparatus, spectrum based on the information received in the beacon signal. In an aspect, for example, the spectrum sharing component 160 and/or the coordination component 162 may be configured to operate in combination with the one or more processors 103, the memory 130, and/or transceiver 106 at the first apparatus (e.g., a tier-3 operating entity, or small cell box 112 in FIG. 1) to utilize spectrum based on the information received in the beacon signal, and/or to share spectrum with at least a second apparatus in a different tier (e.g., tier-2), based on the information received in the beacon signal (e.g., the reservation beacon 222 in FIG. 2B).

In another aspect, the method 400 may include determining, at the first apparatus, whether the beacon signal including an identification of the second apparatus. In an aspect, for example, the spectrum sharing component 160 and/or one or more of its subcomponents may be configured to operate in combination with the one or more processors 103, the memory 130, and/or transceiver 106 to determine whether the received beacon signal including an identification of the second apparatus.

In an aspect, the method 400 may include operating, at the first apparatus and in response to the beacon signal not being received from the second apparatus, in a listen-before-talk (LBT) mode. In an aspect, for example, the spectrum sharing component 160 and/or the coordination component 162 may be configured to operate in combination with the one or more processors 103, the memory 130, and/or transceiver 106 at the first apparatus (e.g., a tier-3 operating entity, or small cell box 112 in FIG. 1) using a LBT mode or scheme in entire band, in response to the beacon signal not being received from the second apparatus (e.g., a tier-2 network entity).

In an aspect, the method 400 may include enabling inter-tier or intra-tier coordination for spectrum sharing with at least the second apparatus based on the beacon signal. In an aspect, for example, the spectrum sharing component 160 and/or the coordination component 162 may be configured to operate in combination with the one or more processors 103, the memory 130, and/or transceiver 106 to enable inter-tier or intra-tier coordination for spectrum sharing based on the beacon signal.

In another aspect, the method 400 may include enabling timing synchronization for spectrum sharing with at least the second apparatus based on the beacon signal. In an aspect, for example, the spectrum sharing component 160 and/or the timing and synchronization component 164 may be configured to operate in combination with the one or more processors 103, the memory 130, and/or transceiver 106 to enable autonomous timing synchronization for spectrum sharing based on the beacon signal.

In another aspect, the method 400 may include receiving the beacon signal with controlled power in one or more resource blocks. In an aspect, for example, the spectrum sharing component 160 may be configured to operate in combination with the transceiver 106 to monitor or receive the beacon signal with controlled power (e.g., full power) in one or more resource blocks.

In an aspect, the method 400 may include receiving the beacon signal periodically. In an aspect, for example, the spectrum sharing component 160 may be configured to operate in combination with the transceiver 106 to monitor or receive the beacon signal periodically.

In another aspect of the method 400, the first apparatus may be in a tier (e.g., tier-2 or tier-3) having a same or lower priority for resources allocation than the tier (e.g., tier-2) of the second apparatus.

In an aspect of the method 400, the first apparatus (e.g., a tier-2 network entity, or a tier-3 operating entity) and the second apparatus (e.g., a tier-2 network entity) may share spectrum in time or frequency.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of spectrum sharing in multi-tier wireless communications, comprising:
generating, at a first apparatus, a beacon signal including information of spectrum usage, wherein the information includes at least one or more of a pilot reference, resources allocation, one or more usage entities, or one or more sharing parameters;
sending, by the first apparatus, the beacon signal to at least a second apparatus, wherein the first apparatus is associated with a respective tier from a plurality of tiers and the second apparatus is associated with a respective tier from the plurality of tiers; and
enabling autonomous inter-tier or intra-tier coordination for spectrum sharing based on the beacon signal by selectively transmitting and receiving beacon signals based on a tier priority.

2. The method of claim 1, wherein the beacon signal includes an identification of the first apparatus.

3. The method of claim 1, further comprising:
enabling timing synchronization for spectrum sharing based on the beacon signal.

4. The method of claim 1, further comprising:
sending the beacon signal with controlled power in one or more resource blocks.

5. The method of claim 1, further comprising:
sending the beacon signal periodically.

6. The method of claim 1, wherein the first apparatus is in a tier having a higher priority for resources allocation than the tier of the second apparatus.

7. The method of claim 1, wherein the first apparatus and the second apparatus share spectrum in time or frequency.

8. The method of claim 1, wherein each tier of the plurality of tiers has a different priority for resources allocation and the respective tier associated with the first apparatus is higher or equivalent to the respective tier associated with the second apparatus.

9. An apparatus for spectrum sharing in multi-tier wireless communications, comprising:
a memory configured to store instructions;
at least one processor coupled to the memory, wherein the at least one processor is configured to execute the instructions to generate a beacon signal including information of spectrum usage, wherein the information includes at least one or more of a pilot reference, resources allocation, one or more usage entities, or one or more sharing parameters; and
a transceiver configured to transmit the beacon signal to at least another apparatus, wherein each apparatus is associated with a respective tier from a plurality of tiers, wherein the at least one processor is further configured to execute the instructions to enable autonomous inter-tier or intra-tier coordination for spectrum sharing based on the beacon signal by selectively transmitting and receiving beacon signals based on a priority of the respective tier.

10. The apparatus of claim 9, wherein the beacon signal includes an identification of the apparatus.

11. The apparatus of claim 9, wherein the at least one processor is further configured to execute the instructions to enable timing synchronization for spectrum sharing based on the beacon signal.

12. The apparatus of claim 9, wherein the transceiver is further configured to transmit the beacon signal with controlled power in one or more resource blocks.

13. The apparatus of claim 9, wherein the transceiver is further configured to transmit the beacon signal periodically.

14. The apparatus of claim 9, wherein the apparatus is in a tier having a higher priority for resources allocation than the tier of the at least another apparatus.

15. A non-transitory computer-readable medium storing computer code executable by a processor for multi-tier wireless communications, comprising:
code for generating, at a first apparatus, a beacon signal including information of spectrum usage, wherein the information includes at least one or more of a pilot reference, resources allocation, one or more usage entities, or one or more sharing parameters;
code for sending, by the first apparatus, the beacon signal to at least a second apparatus, wherein the first apparatus is associated with a respective tier from a plurality of tiers and the second apparatus is associated with a respective tier from the plurality of tiers; and
code for enabling autonomous inter-tier or intra-tier coordination for spectrum sharing based on the beacon signal by selectively transmitting and receiving beacon signals based on a tier priority.

16. The non-transitory computer-readable medium of claim 15, wherein the beacon signal includes an identification of the first apparatus.

17. The non-transitory computer-readable medium of claim 15, further comprising:

code for enabling timing synchronization for spectrum sharing based on the beacon signal.

18. The non-transitory computer-readable medium of claim 15, further comprising:
code for sending the beacon signal with controlled power in one or more resource blocks.

19. The non-transitory computer-readable medium of claim 15, further comprising:
code for sending the beacon signal periodically.

20. The non-transitory computer-readable medium of claim 15, wherein the first apparatus is in a tier having a higher priority for resources allocation than the tier of the second apparatus.

\* \* \* \* \*